(12) United States Patent
Mathew et al.

(10) Patent No.: US 11,245,629 B2
(45) Date of Patent: Feb. 8, 2022

(54) ADAPTIVE SOURCE PORT GENERATION IN OVERLAY NETWORKS

(71) Applicant: VMware, Inc., Palo Alto, CA (US)

(72) Inventors: Subin Cyriac Mathew, San Jose, CA (US); Dileep Devireddy, San Jose, CA (US); Alexander Tessmer, Sun Prairie, WI (US); Wenyi Jiang, Palo Alto, CA (US); Chidambareswaran Raman, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 21 days.

(21) Appl. No.: 16/925,238

(22) Filed: Jul. 9, 2020

(65) Prior Publication Data

US 2022/0014470 A1    Jan. 13, 2022

(51) Int. Cl.
*H04L 12/803* (2013.01)
*H04L 12/741* (2013.01)
*H04L 29/08* (2006.01)
*H04L 29/06* (2006.01)

(52) U.S. Cl.
CPC ............ *H04L 47/125* (2013.01); *H04L 45/74* (2013.01); *H04L 69/166* (2013.01); *H04L 69/325* (2013.01); *H04L 69/326* (2013.01); *H04L 2212/00* (2013.01)

(58) Field of Classification Search
CPC ..... H04L 47/125; H04L 45/74; H04L 69/166; H04L 69/325; H04L 69/326; H04L 2212/00
See application file for complete search history.

(56) References Cited

U.S. PATENT DOCUMENTS

| 9,444,723 | B1* | 9/2016 | Di Benedetto | H04L 12/4641 |
| 10,038,766 | B2* | 7/2018 | Pfister | H04L 45/742 |
| 10,700,893 | B1* | 6/2020 | Krishnamurthy | H04L 12/4641 |
| 10,757,020 | B2* | 8/2020 | Morris | H04L 45/50 |
| 2013/0318219 | A1* | 11/2013 | Kancherla | H04L 41/0806 709/222 |
| 2014/0016545 | A1* | 1/2014 | Jaiswal | H04W 80/02 370/328 |

(Continued)

OTHER PUBLICATIONS

Related U.S. Appl. No. 17/068,670, filed Oct. 12, 2020, 40 pages.

(Continued)

*Primary Examiner* — Mohamed A. Wasel

(57) ABSTRACT

In some embodiments, a method determines when a packet is fragmented into multiple fragmented packets in a flow between a first workload and a second workload. The method switches from generating an outer source port in the outer header using layer 4 information from the inner header to using layer 3 information from the inner header. A fragmented packet is encapsulated with the outer header that includes an outer source port value that is generated using the layer 3 information. The method initiates a process to determine when to switch back to using layer 4 information from the inner header to generate the outer source port. When it is determined to switch back to using layer 4 information, the method switches back to using layer 4 information from the inner header to generate the source port in the outer header of a packet from the first workload.

21 Claims, 12 Drawing Sheets

(56) References Cited

U.S. PATENT DOCUMENTS

| | | | | |
|---|---|---|---|---|
| 2014/0269709 | A1* | 9/2014 | Benny | H04L 61/2007 |
| | | | | 370/392 |
| 2015/0188773 | A1* | 7/2015 | DeCusatis | G06F 9/45558 |
| | | | | 370/254 |
| 2019/0020684 | A1* | 1/2019 | Qian | H04L 63/102 |
| 2019/0028442 | A1* | 1/2019 | Pillai | H04L 63/0428 |
| 2020/0021558 | A1* | 1/2020 | Xu | H04L 12/4679 |

OTHER PUBLICATIONS

Mahalingam, et al., "Virtual extensible Local Area Network (VXLAN): A Framework for Overlaying Virtualized Layer 2 Networks over Layer 3 Networks"; https://tools.ietf.org/html/ifc7348; Aug. 2014 (22 pages).

SolarFlare, "Reordering between fragmented and non-fragmented UDP Packets", https://support.solarflare.com/index.php/component/cognidox/?file=SF-119017-KI-1_Reordering_between_fragmented_and_non-fragmented_UDP_packets.htm&catid=0&view=embed&id=3013; Jul. 9, 2020 (1 page).

* cited by examiner

Outer IPv4 Header
400-1

| Version | IHL | Type of Service | Total length | |
|---|---|---|---|---|
| Identification | | | Flags | Fragment offset |
| Time to Live | | Protocol | Header checksum | |
| Outer Source IPv4 Address 412-1 | | | | |
| Outer Destination IPv4 Address 414-1 | | | | |

Outer UDP Header
402-1

| 416-1 Source Port = 50000 | 418-1 Destination port = 6081 |
|---|---|
| UDP length | UDP checksum |

Inner IPv4 Header
404-1

| Version | IHL | Type of Service | Total length | |
|---|---|---|---|---|
| Identification | | | Flags | Fragment offset |
| Time to Live | | Protocol = 17 UDP | Header checksum | |
| Inner Source IPv4 Address 420-1 | | | | |
| Inner Destination IPv4 Address 422-1 | | | | |

Inner UDP Header
406-1

| 424-1 Source Port = 10000 | 426-1 Destination port = 20000 |
|---|---|
| UDP length | UDP checksum |

FIG. 4

ADAPTIVE SOURCE PORT GENERATION IN OVERLAY NETWORKS

BACKGROUND

Virtual networks may use an underlying physical network as a packet forwarding back plane. For example, a first workload running in a first host may send a packet to a second workload running in a second host. The packet may include an inner source IP address for the first workload and an inner destination IP address for the second workload. The first host may encapsulate the packet with an outer header that includes an outer source IP address associated with a source hypervisor in the first host and an outer destination IP address associated with a destination hypervisor in the second host. Typically, the source IP address and the destination IP address are associated with virtual tunnel endpoints (VTEPs), which may be a hypervisor-based logical functionality that may perform the encapsulation. The first host then sends the encapsulated packet to the underlay physical network, which delivers the packet to the destination hypervisor in the second host based on the outer source IP address. The destination hypervisor removes the outer header, and a local virtual switch instance delivers the packet to the second workload using an inner destination IP address.

Different processes, such as load balancing processes, typically use information in the outer header to differentiate flows to perform services, such as load balancing, equal cost multi-path routing (ECMP), and other services. In some embodiments, the processes use a 5-tuple of <inner source IP address, inner destination IP address, IP next protocol, inner source port, destination source port>. When using encapsulation, multiple flows that are encapsulated by the two VTEP endpoints include the same outer source IP address and outer destination IP address when the flows originate and end at the same workloads. The destination port in the outer header may be a well-known port that is used by tunneling technologies, such as "4789" for Virtual eXtensible Local Area Network (VXLAN) or "6081" for Generic Network Virtualization Encapsulation (Geneve). Accordingly, the source port in the outer header may be used to introduce differences in the packets being sent in two flows. However, typically, the host uses layer 3 information from the inner header to generate the source port for the outer header when protocols, such as user datagram protocol (UDP), include the layer 4 information in the inner header in the first packet of fragmented packets, but the rest of the fragmented packets may only include layer 3 information in the inner header. When a first flow is between a first application in the first host and another application in the second host and a second flow is between a second application in the first host and another application in the second host, the inner IP address of the packets of the two flows are the same (e.g., the first workload's IP address and the second workload's IP address). When the first host uses only layer 3 information of the source IP address and the destination IP address of the inner header to generate the source port for the outer header, this results in the two flows having the same outer source port. That is, the IP address of the source workload and the destination workload are the same for both flows even though different applications are associated with the flows. Accordingly, the services may consider the packets for the flows the same because the outer headers are the same for both flows. As such, the services may apply the same treatment for the flows, such as assigning the flows to the same physical servers, queues, computer processors, etc.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 4 depicts an example of outer headers and inner headers for a flow #1 between an application #1 and an application #3 according to some embodiments.

DETAILED DESCRIPTION

Figure 1:
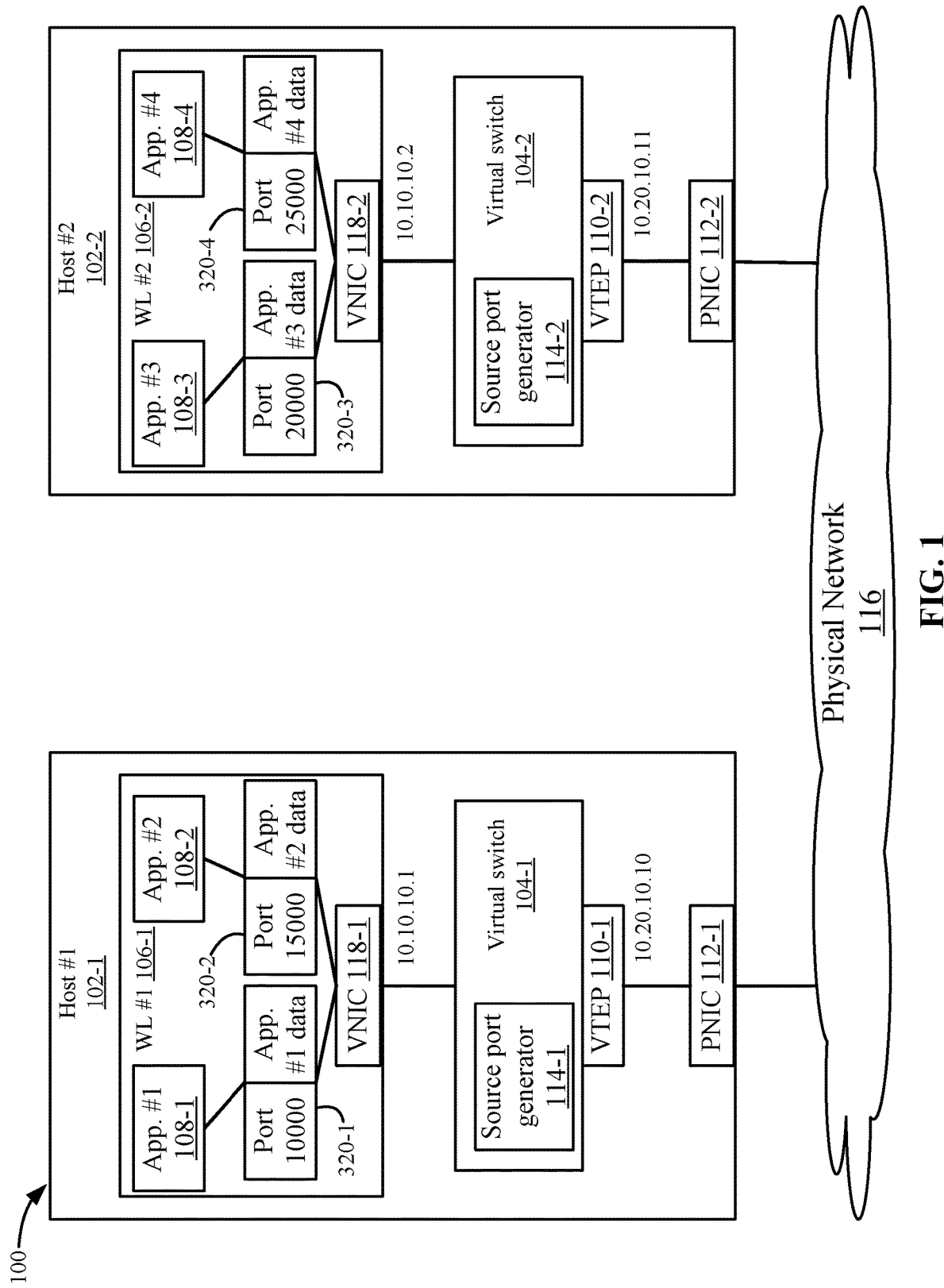
FIG. 1 depicts a simplified system for sending packets using source port generation according to some embodiments.

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein. Note that some explanations herein, may reflect a common interpretation or abstraction of actual processing mechanisms. Some descriptions may abstract away complexity and explain higher level operations without burdening the reader with unnecessary technical details of well understood mechanisms. Such abstractions in the descriptions herein should be construed as inclusive of the well understood mechanism.

When processing packets from for multiple flows between workloads, a hypervisor, such as using a virtual tunnel endpoint (VTEP), may encapsulate the packet with an outer header that includes outer source information and outer destination information. As discussed in the Background, if the host uses only network layer (e.g., layer 3) information from an inner header of the packet to generate the outer source port for the outer header, the source port for the outer header may be the same for two flows. To inject some differences in the source port generation, a source host may use transport layer (e.g., layer 4 information), such as a layer 4 source port and a layer 4 destination port, from the inner header to generate the outer source port in the outer header. In some examples, the source host may generate the outer source port using a tuple of information, which may include the inner source IP address, the inner source port, the inner destination IP address, and the inner destination port (and also the next layer protocol). As discussed above, the flows may include different source applications and/or different destination applications. The different applications from the flows may be associated with different inner source ports and/or different inner destination ports. The source host uses a process, such as a hash of the tuple, to generate different values for outer source ports for the flows because the inner source port and/or the inner destination port are different for the two flows between different applications. Accordingly, the outer header of packets for the two flows may include different outer source ports, and processes, such as load balancing processes, can differentiate between the packets for the different flows. When applying load balancing to the flows, having a different outer source port allows network traffic for the flows to be distributed more equally across network resources.

Sometimes, a packet sent by a workload may need to be fragmented. For example, a host may fragment a large packet sent by an application if the size of the packet exceeds the maximum transmission unit that is defined for the workload. It is possible that some protocols, such as user datagram protocol (UDP), may include the layer 4 information in the inner header in the first packet of the fragmented packets, but the rest of the fragmented packets may only include layer 3 information in the inner header. This may result in undesirable packet processing behavior if the host uses layer 4 information to generate the outer source port in the first packet and then uses layer 3 information to generate the outer source port in the other packets due to the first packet may have a different outer source port than the other fragmented packets. For example, the different outer source ports may result in encapsulated packets for the flow being reordered in the packet path to the destination, such as because a load balancer may consider the packets as being from different flows because of the different outer source ports and send them on different paths. To avoid this problem, in a fragmented packet situation, the host may only use layer 3 source port generation. In this case, when the host detects a fragmented packet is being sent, the host may switch from using layer 4 information to generate the outer source port to generating the outer source port using layer 3 information.

However, using layer 3 information to generate the outer source port again causes the above behavior where processes may not be able to differentiate different flows between different applications between the same workloads. Accordingly, the host is configured to switch back to using layer 4 information for source port generation. But, switching back to layer 4 source port generation may also incur undesirable packet processing behavior. For example, if an application is sending large and small packets, the host may be switching between using layer 4 source port generation for the small packets and layer 3 source port generation for the larger packets, which could also cause re-ordering among the small packets and the fragmented packets. Accordingly, the host may use different processes to determine when to switch back to layer 4 source port generation upon switching to layer 3 source port generation. These processes include time based analysis of packet types and prediction based analysis of packet types to determine when to switch back to using layer 4 source port generation.

System Overview

FIG. 1 depicts a simplified system 100 for sending packets using source port generation according to some embodiments. System 100 includes a first host #1 102-1 and a second host #2 102-2 (collectively hosts 102). Hosts 102 may be networking devices that process and send the packets and include hardware resources including computer processor resources (not shown), memory resources (not shown), and physical network interface cards (PNICs) 112-1 and 112-2. PNICs 112 couple hosts 102-1 and 102-2 to a physical network 116. Although this system is described, any system in which encapsulated packets are sent/received may be used. For example, host 102-1 may be located on-premises in a site and host 102-2 may be located in a public data center, hosts 102 may be located in a single site, etc.

Hosts 102 may run virtualization software (not shown) on which workloads (WLs) 106-1 and 106-2 (collectively workloads 106) run. Any number of workloads may be running on hosts 102, but for illustration purposes, host #1 102-1 is running a workload #1 106-1 and host #2 102-2 is running a workload #2 106-2. Workloads may refer to virtual machines that are running on a respective host, but this is one example of a virtualized computing instance or compute node. Any suitable technology may be used to provide a workload. Workloads may include not only virtual machines, but also containers (e.g., running on top of a host or guest operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads. Although a virtualized environment is described, some embodiments may be used in an environment that is not virtualized. Also, the term "workload" may refer to a host that is not virtualized.

Workloads 106 may execute different software applications 108. In some instances, application (APP) 108-1 and/or application 108-2 in workload #1 106-1 send packets to applications 108-3 and/or application 108-4 in workload #2 106-2, and vice versa. For illustrative purposes, application #1 108-1 is communicating with application #3 108-3 and application #2 108-2 is communicating with application #4 108-4. However, it is noted that other configurations may be appreciated, such as application #1 108-1 and application #2 108-2 may both be communicating with a single application in workload #2 106-2, or vice versa.

As mentioned above, host #1 102-1 and host #2 102-2 may use encapsulation to send packets between workload #1 106-1 and workload #2 106-2 via tunnels. A tunnel is a mechanism in which hosts 102 can encapsulate packets with an outer header and send the encapsulated packets via physical network 116, which may be referred to as an underlay. Physical network 116 may include physical networking devices, such as routers, which use IP addresses of the outer header to route the packets to the destination in the outer header. Different tunneling technologies may be used, such as VXLAN and Geneve, but embodiments are not limited to these technologies.

Host #1 102-1 includes a virtual switch 104-1 and host #2 102-2 includes a virtual switch 104-2 that provide connectivity between workloads in hosts 102. Virtual switches 104 may be running within hypervisors or other virtualization software on hosts 102. Virtual switches 104 may be software implemented physical switches that perform functions of physical switches. Virtual switches may implement different configurations, such as a distributed virtual switch that may be a virtual switch that is distributed across multiple hypervisors. In some embodiments, virtual switch 104-1 is associated with a VTEP 110-1 and virtual switch 104-2 is associated with a VTEP 110-2. VTEPs 110 may be logical functionality that can perform encapsulation of packets sent by workloads 106. Although VTEPs 110 are shown as running in virtual switches 104, VTEPs 110 may run elsewhere, such as in workloads or other instances running in the hypervisors of each host. Further, any functionality may be used to encapsulate packets in place of VTEPs 110, such as layer 2 concentrators executing in a workload that stretch a layer 2 network across multiple sites may be used to perform encapsulation.

Each VTEP 110 may be associated with an IP address, such as VTEP 110-1 is associated with the IP address of 10.20.10.10 and VTEP 110-2 is associated with the IP address of 10.20.10.11. These IP addresses are recognized by routers in physical network 116 and routers can route the packets using the IP addresses using route tables that list the IP addresses and next hops required to send the packets to the outer destination address. In the process, workload 106-1 may send a packet with the inner source IP address of workload 106-2 and the inner destination address of workload 106-2. The "inner" term is used to differentiate from the IP addresses in the outer header that encapsulates the packet. VTEPs 110 encapsulate the inner packet with an outer header that includes the source IP address of VTEP 110-1 and a destination address of VTEP 110-2. Physical network 116 can then route the encapsulated packets based on the source IP address of VTEP 110-1 and the destination address of the packet to VTEP 110-2. When VTEP 110-2 receives the encapsulated packet, VTEP 110-2 can remove the outer header. Virtual switch 104-2 can then use the destination IP address in the inner header to send the packet to workload #2 106-2.

Applications 108 in workloads 106 may be associated with different virtual ports. Applications 108 may run in guest user space and are associated with application data that identifies the application. A guest kernel space associates a port for an application 108 with respective application data. For example, at 320-1, application #1 108-1 is connected to a port (e.g., virtual port) of "10000" that is associated with application #1 data and at 320-2, application #2 108-2 is connected to a port 15000 that is associated with application #2 data. Similarly, at 320-3, application #3 108-3 is connected to a port 20000 that is associated with application #3 data, and at 320-4, application #4 108-4 is connected to a port 25000 that is associated with application #4 data. The ports on virtual switches 104 provide logical connection points to applications 108. Virtual network interface cards (VNICs) 118-1 and 118-2 that are virtual PNICs presented to respective workloads 106 by the respective hypervisors on hosts 102-1 and 102-2.

Various protocols may be used to send the packets. In some embodiments, UDP is used to send inner packets, which is a connectionless communication model that may not use error checking or error correction. As discussed above, UDP has characteristics where a fragmented packet includes layer 4 information in the first fragmented packet, but not in the subsequent fragmented packets. It will be understood that although UDP is discussed, other protocols that include similar characteristics for including only layer 4 information in one of the fragmented packets may be used.

In some embodiments, a source port generator 114-1 may generate an outer source port value for the outer header when sending packets from workload #1 106-1 to workload #2 106-2. Similarly, a source port generator 114-2 generates outer source port values for packets sent from workload #2 106-2 to workload #1 106-1. As will be described below, source port generators 114 may use layer 4 information from the inner header to generate the outer source port value. Further, when host 102 fragments a packet, source port generator 114 may use layer 3 information from the inner header to generate the outer source port value. Then, host 102 uses a process to determine when to revert back to using layer 4 source port generation to generate the outer source port. The process is designed to minimize problems that may be experienced when switching between using layer 4 and layer 3 information from the inner header for source port generation. For example, as will be discussed in more detail below, host 102 may analyze packets being sent in the flow to determine when to switch back to using layer 3 source port generation for source port generation.

Packet Transmission

Figure 2:
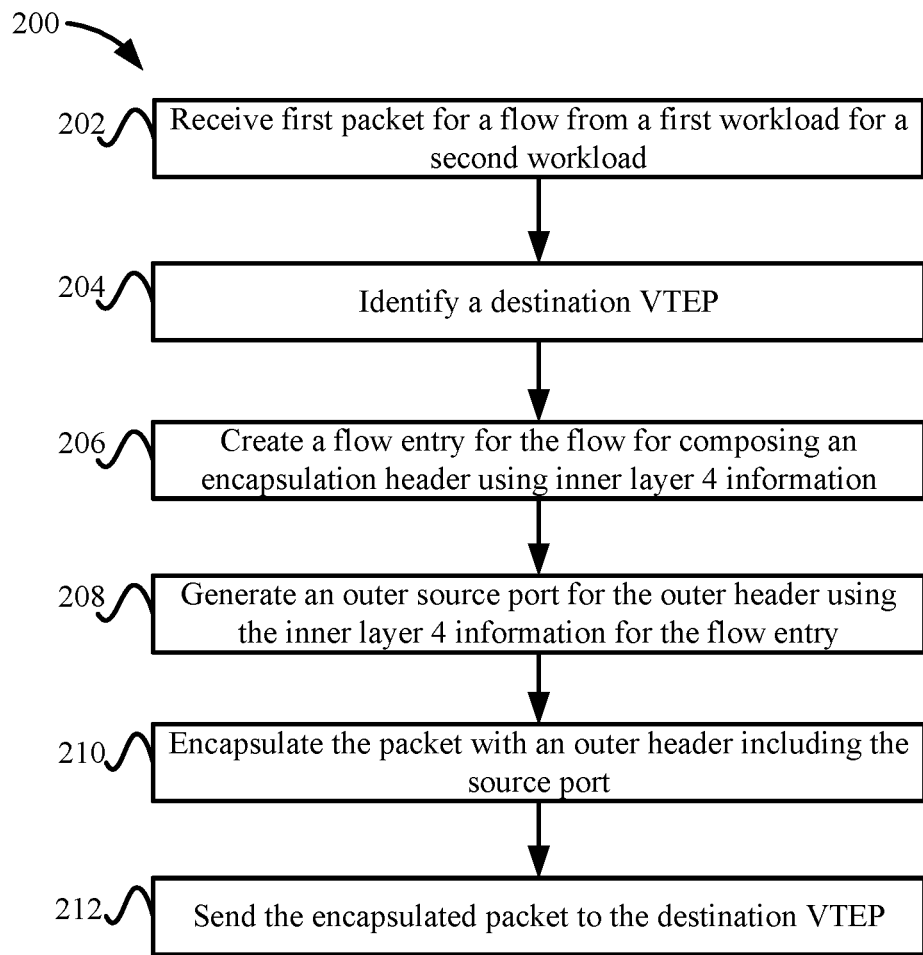
FIG. 2 depicts a simplified flowchart of a method for sending encapsulated packets using source port generation according to some embodiments.

FIG. 2 depicts a simplified flowchart 200 of a method for sending encapsulated packets using source port generation according to some embodiments. The flow is from host 102-1 to host 102-2, but similar processes from host 102-2 to host 102-1 also apply. At 202, virtual switch 104-1 receives a first packet for a flow, such as a flow from workload #1 106-1 to workload #2 106-2. When a packet is sent between application #1 108-1 and application #3 108-3, the inner header includes an inner source IP address of workload #1 106-1 (10.10.10.1), an inner destination IP address of workload #2 106-2 (10.10.10.2), an inner source port of 10000 for application #1 108-1, and an inner destination port of 20000 for application #3 108-3. The inner source IP address and the inner destination IP address are layer 3 information and the inner source port and inner destination port are layer 4 information. When a communication occurs between application #2 108-2 and application #4 108-4, the inner source IP address and the inner destination IP address are the same because the same workloads are sending and receiving the packets, but the inner source port is 15000 for application #2 108-2 and the inner destination port is 25000 for application #4 108-4.

At 204, virtual switch 104-1 may identify the destination VTEP for workload #2 106-2. In some embodiments, virtual switch 104-1 uses a table to identify the VTEP. For example, the table lists media access control (MAC) address for workloads 106 and associated VTEP IP addresses for the associated workloads 106. Virtual switch 104 may look up the MAC address for a destination workload to determine the associated VTEP. When workload #2 is the destination, virtual switch 104-1 determines that the VTEP IP address is 10.20.10.11 (e.g., VTEP 110-2).

Figure 3:
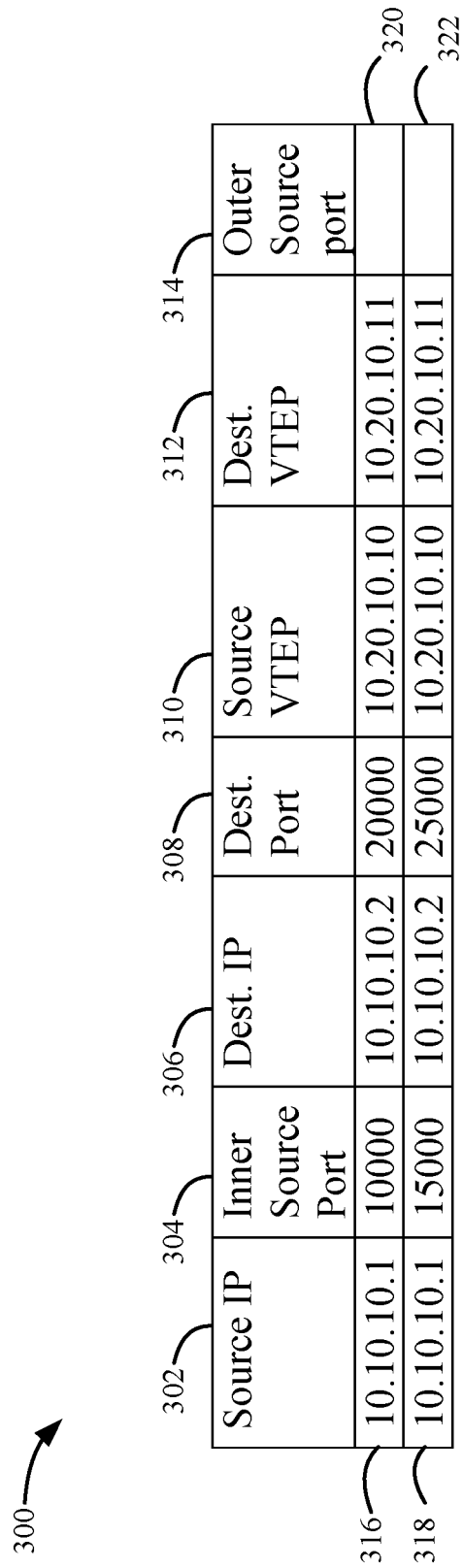
FIG. 3 depicts an example of a flow table according to some embodiments.

At 206, virtual switch 104-1 creates a flow entry for the flow that can be used to compose an encapsulation header using inner layer 4 information. The flow entry may include different information for the flow. For example, FIG. 3 depicts an example of a flow table 300 according to some embodiments. Flow table 300 includes columns 302 to 314 for the inner source IP address, the inner source port, the inner destination IP address, the inner destination port, the source VTEP IP address, the destination VTEP IP address, and the outer source port, respectively. Each entry of flow table 300 may be associated with a different flow, such as a flow 316 is associated with application #1 108-1 and application #3 108-3 and a flow 318 is associated with application #2 108-2 and application #4 108-4. The flow entries include inner layer 3 information of the IP addresses for workloads 106-1 and 106-2 and respective layer 4 information for the source ports of respective applications 108-1 to 108-4. Also, the flow entries include outer IP addresses for VTEPs 110.

Referring back to FIG. 2, at 208, source port generator 114-1 generates an outer source port for the outer header using the inner layer 4 information for the associated flow entry. Virtual switch 104-1 uses information in the flow entries are used to generate outer source ports at 320 and 322 for the outer header as described below. For example, virtual switch 104-1 uses layer 3 and layer 4 information or layer 3 information without layer 4 information to generate the outer source port. In some examples, when using both layer 3 and layer 4 information, source port generator 114 may use a 5-tuple of <inner source IP address, inner destination IP address, IP next protocol, inner source port, destination source port>. The inner source IP address and inner source port are associated with the sender; the inner destination IP address and inner destination port are associated with the destination; and IP next protocol may be the protocol used for the encapsulation header. In this 5-tuple, source port generator 114 may use the layer 4 inner source port value and the layer 4 inner destination port value as part of the source port generation process, such as by using a hash of the 5-tuple values. When using different layer 4 inner source port and the layer 4 inner destination port values, source port generator 114 generates different values for the outer source port values. For example, for a flow #1 between application #1 108-1 and application #3 108-3, the inner source port is 10000 and the inner destination port is 20000. For application #2 108-2, the inner source port is 15000 and the inner destination source port is 25000. Source port generator 114 thus generates different outer source port values when using the layer 4 information of the source and destination ports for the different flows. When using layer 3 and not layer 4 information, source port generator 114 may use a 3-tuple of <inner source IP address, inner destination IP address, IP next protocol>. The flows between the same workloads 106 may have the same outer source ports in this case.

At 210, VTEP 110-1 encapsulates the packet with an outer header that includes the generated outer source port. Then, at 212, host #1 102-1 sends the encapsulated packet to destination VTEP 110-2 via physical network 116. Physical network 116 routes the encapsulated packet using information in the outer header. Once receiving the encapsulated packet, PNIC 112-2 processes the packet, and then VTEP 110-2 decapsulates the packet. Virtual switch 104-2 can deliver the unencapsulated packet to workload 106-2 via the specified destination port to the destination application 108.

Header Examples

Figure 5:
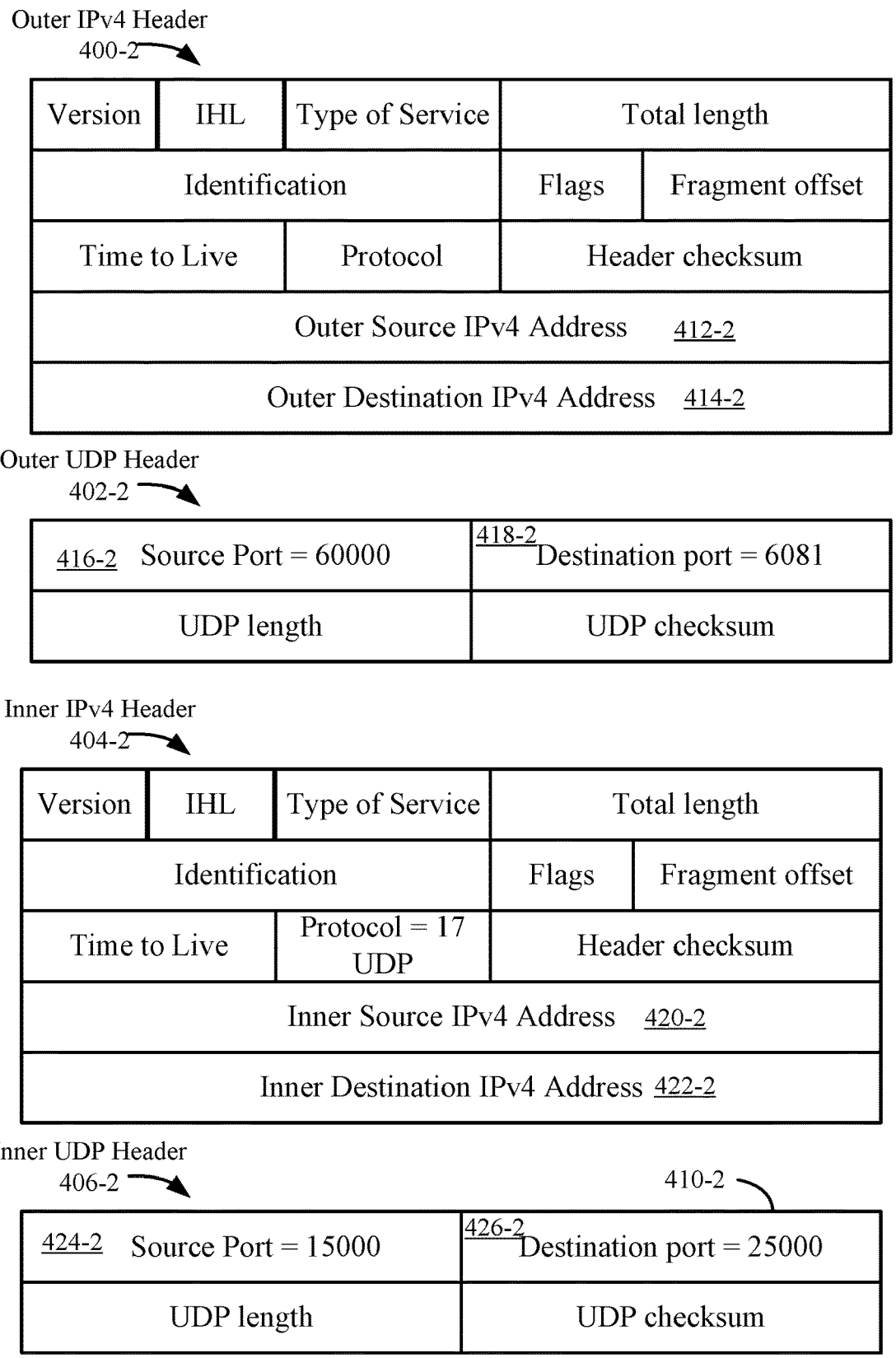
FIG. 5 depicts an example of outer headers and inner headers for a flow #2 between an application #2 and an application #4 according to some embodiments.

FIGS. 4 and 5 depict examples of outer headers and inner headers according to some embodiments. FIG. 4 depicts an example of outer headers and inner headers for a flow #1 between application #1 108-1 and application #3 108-3 according to some embodiments. Outer IPv4 header 400-1 and outer UDP header 402-1 encapsulate the inner packet which includes inner IPv4 header 404-1 and inner UDP header 406-1. These headers include various fields that are well-known in the art and need not be described.

Outer IPv4 header 400-1 includes an outer source IPv4 address at 412-1 and an outer destination IPv4 address at 414-1. The outer source IPv4 address at 412-1 is associated with workload #1 106-1 and the outer destination IPv4 address is associated with workload #2 106-2. Although the protocol IPv4 is described, other IP protocols may be used, such as the protocol IPv6. Outer IPv4 header 400-1 also includes other fields, such as a protocol version which signifies the current IP protocol version used, the header length (IHL), type of service, total length, identification, flags, fragment offset, time to live, protocol, and header checksum.

Outer UDP header 402-1 may use the UDP protocol. UDP header 402-1 includes an outer source port at 416-1, an outer destination port at 418-1, a UDP length, and a UDP checksum. The outer destination port may be a well-known port used by the tunneling protocol, which is listed as "6081" because the tunneling technology of Geneve is being used in this case, but the outer destination port may be other values. The destination port may be the same for all packets sent using the same tunneling technology.

Inner IPv4 header 404-1 includes an inner source IPv4 address at 420-1 for workload 106-1 and an inner destination IPv4 address at 422-1 for workload 106-2. Inner UDP header 406-1 includes an inner source port of "10000" at 424-1 and an inner destination port of "20000" at 426-1. Inner source port is the port associated with application #1 108-1 and the inner destination port is the port associated with application #3 108-3. At 416-1, the source port value of "50000" is generated by using the inner source IPv4 address of inner IPv4 header 404-1, the inner destination IPv4 address of inner IPv4 header 404-1, the source port of inner UDP header 406-1, and the destination port of inner UDP header 406-1 (and the next level protocol). The following will show the differences in source port generation for a different flow.

FIG. 5 depicts an example of outer headers and inner headers for a flow #2 between application #2 108-2 and application #4 108-4 according to some embodiments. Flow #2 is between the same workloads #1 and #2, but the communication is between different applications 108 (e.g., one or two different applications) from flow #1. In outer IPv4 header 400-2, the inner source IPv4 address at 412-2 and the inner destination IPv4 address at 414-2 are the same as found in outer IPv4 header 400-1 for flow #1 because VTEPs 110 are the same for the flows. Further, in inner IPv4 header 404-2, the inner source IPv4 address at 420-2 and the inner destination IPv4 address at 422-2 are the same as found in inner IPv4 header 404-1 for flow #1 because workloads 106 are the same for the flows. However, at 424-2 and 426-2, the inner source port and the inner destination port are different in inner header 406-2 compared to inner header 406-1 in FIG. 4 because different applications 108 that are associated with different ports are used. When source port generator 114 uses different values for the inner source port and the inner destination port to generate the source port for outer UDP header, the source port value of 60000 at 416-2 is different from the source port value of "50000" at 416-1 in outer UDP header 402-1 in FIG. 4.

Fragmented Packet Processing

When using a protocol that does not include layer 4 information in some fragmented packets (e.g., other than the first fragmented packet), undesirable packet processing issues may occur when processing the packets in the packet path to the destination. For example, no differentiation between multiple flows may also be an issue where applications have latency and jitter constraints that may be exacerbated when there is no load balancing between multiple flows. Also, re-ordering of packets at the destination may occur, which may require the destination to have deep buffers to account for the receipt of non-contiguous packets within a flow. Two situations may lead to packet re-ordering when using layer 4-based source port generation for fragmented packets. A large UDP packet sent by an application may be fragmented by the guest operating system if the packet exceeds the maximum transmission unit of the workloads IP interface. If virtual switch 104 generates the outer source port based on layer 4 information for the first fragment and then uses layer 3 for the subsequent fragmented packets, the encapsulated packets may end up getting re-ordered in the packet path to the destination. Accordingly, virtual switch 104 may only use layer 3-based source port generation for fragmented packets. However, if application 108 sends a mix of large and small packets, and layer 4-based source port generation is used for smaller packets and then layer 3 source port generation is used for fragmented packets, re-ordering issues may also exist among these packets as the packets can take different paths on the way to the destination. Accordingly, virtual switch 104 may use layer 4 information from the inner header for source port generation for flows but may switch from using layer 4 information to using layer 3 information when a fragmented packet is encountered. Virtual switch 104 then decides when to switch back to layer 4 source port generation. For discussion purposes, the term layer 4 source port generation includes using layer 4 information from the inner header to generate the outer source port and layer 3 source port generation includes using layer 3 source port generation.

Figure 6:
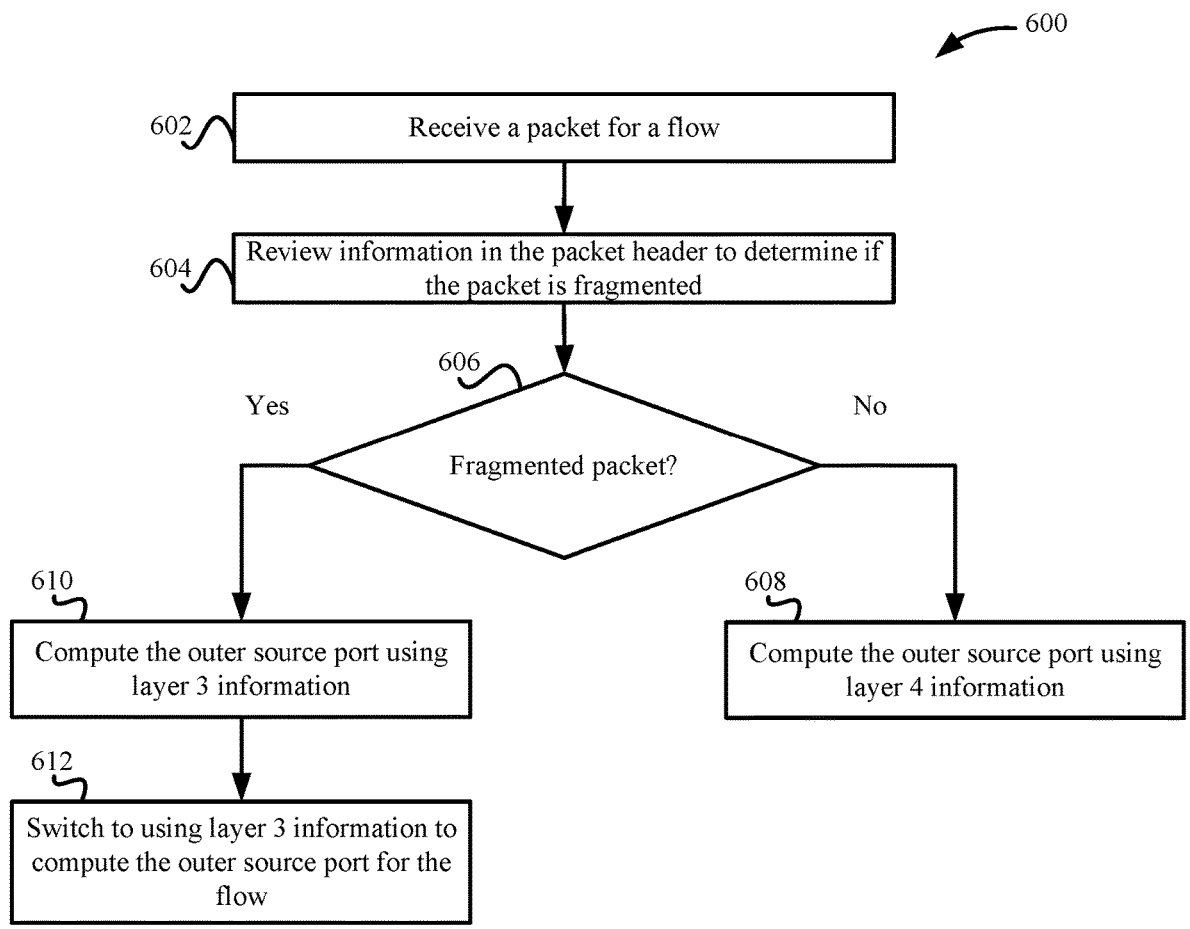
FIG. 6 depicts a method for processing fragmented packets for source port generation according to some embodiments.

Virtual switch 104 may first determine when to switch from using layer 4 source port generation to using layer 3 source port generation when a first fragmented packet is encountered. This may not cause undesirable behavior where source port generator 114 generates an outer source port for one fragmented packet using layer 4 source port generation and outer source ports for other fragmented packets using layer 3 source port generation. FIG. 6 depicts a method for processing fragmented packets for source port generation according to some embodiments. At 602, virtual switch 104 receives a packet for a flow. At 604, virtual switch 104 reviews the information, such as in the inner header, to determine if the packet is fragmented. Virtual switch 104 may determine that the packet is fragmented using different methods. For example, a flag in inner IPv4 header 404 may be set in a flags field, such as a "more fragment" flag is set to indicate the packet is fragmented from a larger packet. The more fragment flag may indicate that more fragments may be sent and is set in fragmented packets except the last fragmented packet. Also, virtual switch 104 may use the fragment offset value in inner IPv4 header 404, which indicates the offset of this fragment relative to the beginning of the original unfragmented packet. The last packet may have a fragment offset and the last packet can be identified as a fragment using the offset. Other methods may also be used.

At 606, virtual switch 104 determines if the packet is a fragmented packet. If not, at 608, virtual switch 104 computes the outer source port using layer 4 source port generation as described above.

If the packet is a fragmented packet, at 610, source port generator 114-1 computes the outer source port using layer 3 source port generation. Then, at 612, source port generator 114-1 switches to using layer 3 source port generation to compute the outer source port for the flow. That is, source port generator 114-1 uses layer 3 information from the inner header to compute the outer source port for other packets that are sent in the flow. Accordingly, virtual switch 104 may be initially set to perform layer 4 source port generation until a fragmented packet is encountered. Flows are processed using the benefits of layer 4 source port generation until fragmented packets are encountered.

Figure 7:
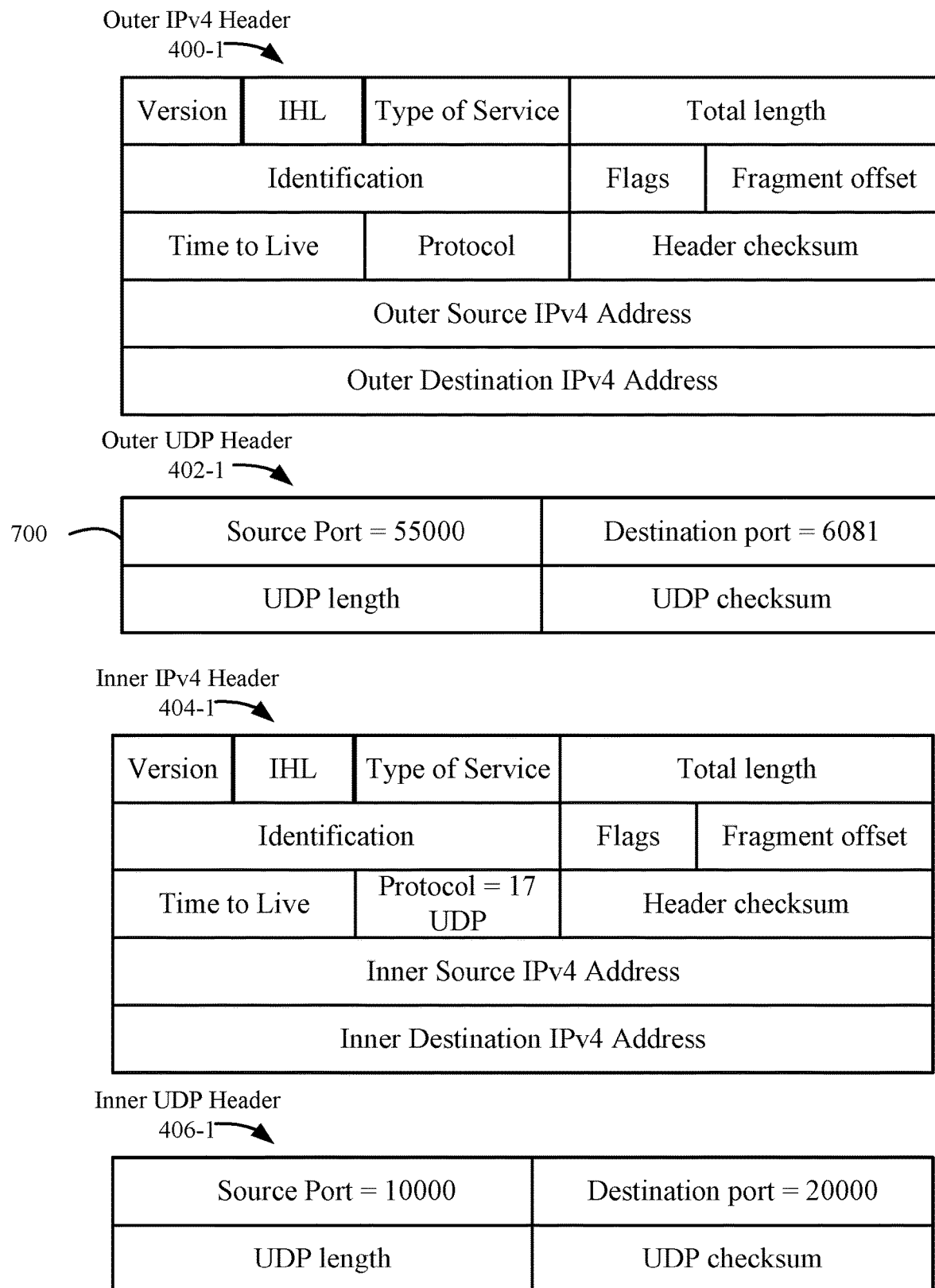
FIG. 7 depicts an example of the outer header and inner header for both flows according to some embodiments.

When switching to using layer 3 source port generation, the outer source port is the same flows using layer 3 source port generation between the same two workloads 106 as discussed above. FIG. 7 depicts an example of the outer header and inner header for both flows according to some embodiments. At 700, the outer source port is equal to 55000. Because the inner source IPv4 address and the inner destination IPv4 address is used and not the inner source port and the inner destination port, the outer source port for outer UDP header 402-1 will be the same for both flows. Also, the source port value of 55000 is different from the source port value of 50000 for flow #1 and 60000 for flow #2 when using layer 4 source port generation. However, if multiple flows switch to using layer 3 source port generation because fragmented packets are encountered, then processes may not be able to differentiate between the flows because the outer source port is the same along with the other information in a tuple that is used to perform load balancing.

Switching Back to Layer 4 Source Port Generation

While using layer 3 source port generation may not encounter undesirable issues for this set of fragmented packets, which may not be re-ordered because layer 3 source port generation is used for all of the fragmented packets, virtual switch 104 may switch back to using layer 4 information for outer source port generation at some later time. For example, virtual switch 104 may use a process to determine when to switch back to using layer 4 source port generation. The process may be performed to limit switching back and forth between layer 3 source port generation and layer 4 source port generation when large and small packets are being sent in a flow. Virtual switch 104 may use different methods as described herein.

Figure 8:
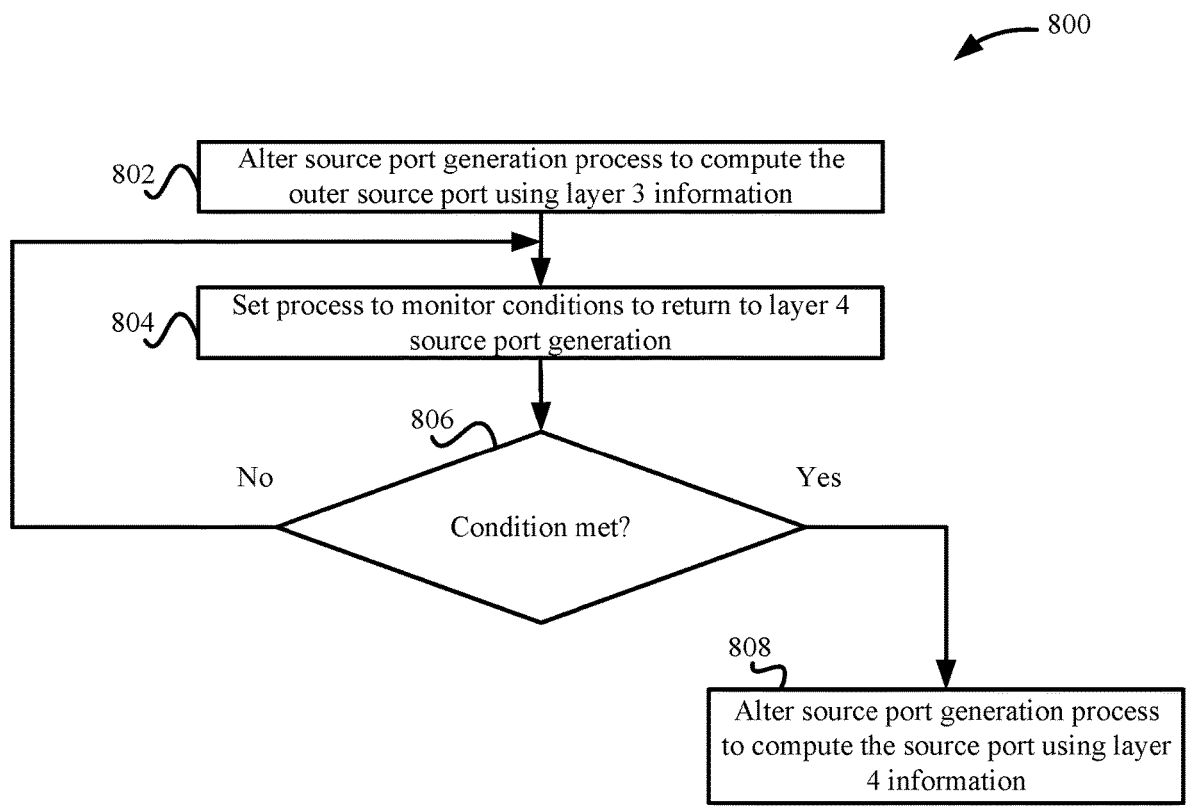
FIG. 8 depicts a simplified flowchart of a method for switching between using layer 3 information for outer source port generation and using layer 4 information for source port generation according to some embodiments.

FIG. 8 depicts a simplified flowchart 800 of a method for switching between using layer 3 information for outer source port generation and using layer 4 information for source port generation according to some embodiments. At 802, virtual switch 104 alters the source port generation process to compute the outer source port using layer 3 source port generation. For example, virtual switch 104 may switch the source port generation process for only the flow that sent the fragmented packet. In other embodiments, virtual switch 104 may switch to layer 3 source port generation for other flows, such as for all flows associated with a workload that sent the fragmented packet. When using layer 3 source port generation, virtual switch 104 may set a flag for the port of the application 108 that indicates layer 3 source port generation should be used or may set a flag for all of the ports associated with workload 106 that change. In other embodiments, virtual switch 104 may also alter the flow table to change the value of the outer source port. For example, virtual switch 104 may compute the outer source port using layer 3 information and not layer 4 information and insert the value into the outer source port entry for the application flow. It is noted that the flow table may not need to be changed and virtual switch 104 can determine which information to use from the information in the flow table, such as the layer 3 information or the layer 4 information, based on a flag that is set to identify which source port generation process to use.

At 804, virtual switch 104 sets a process to monitor conditions to return to using layer 4 source port generation. Different processes may be used, which will be described in more detail below. At 806, virtual switch 104 determines if a condition is met to switch back to layer 4 source port generation. If not, the process reiterates to continue to monitor the conditions. If the condition is met, at 808, virtual switch 104 alters the source port generation process to compute the outer source port using layer 4 source port generation.

In some embodiments, the process that monitors the conditions may use layer 3 source port generation for the duration of the flow, such as until the flow entry is removed from the flow table. When the flow ends, virtual switch 104 may revert back to using layer 4 source port generation for either the flow or to other flows from workload 106 if all flows were using layer 3 source port generation. For example, virtual switch 104 may remove the tag associated with the source port that indicates layer 3 source port generation should be performed for applicable flows. When this process is used, it is assumed that the application 108 that is associated with this flow may not typically send larger packets that require fragmentation. As long as application 108 only sends non-fragmented packets, the flow may benefit from any differentiation from other flows. However, once an application in workload 106 sends one fragmented packet, then the flow for application 108 will only use layer 3 source port generation. Thus, differentiation for flows between two workloads 106 that use layer 3 source port generation may be lost until the flow ends and the flow entry is deleted. Further, differentiation for all flows for a workload 106 may be lost if all flows for a workload are switched to layer 3 source port generation.

Figure 9:
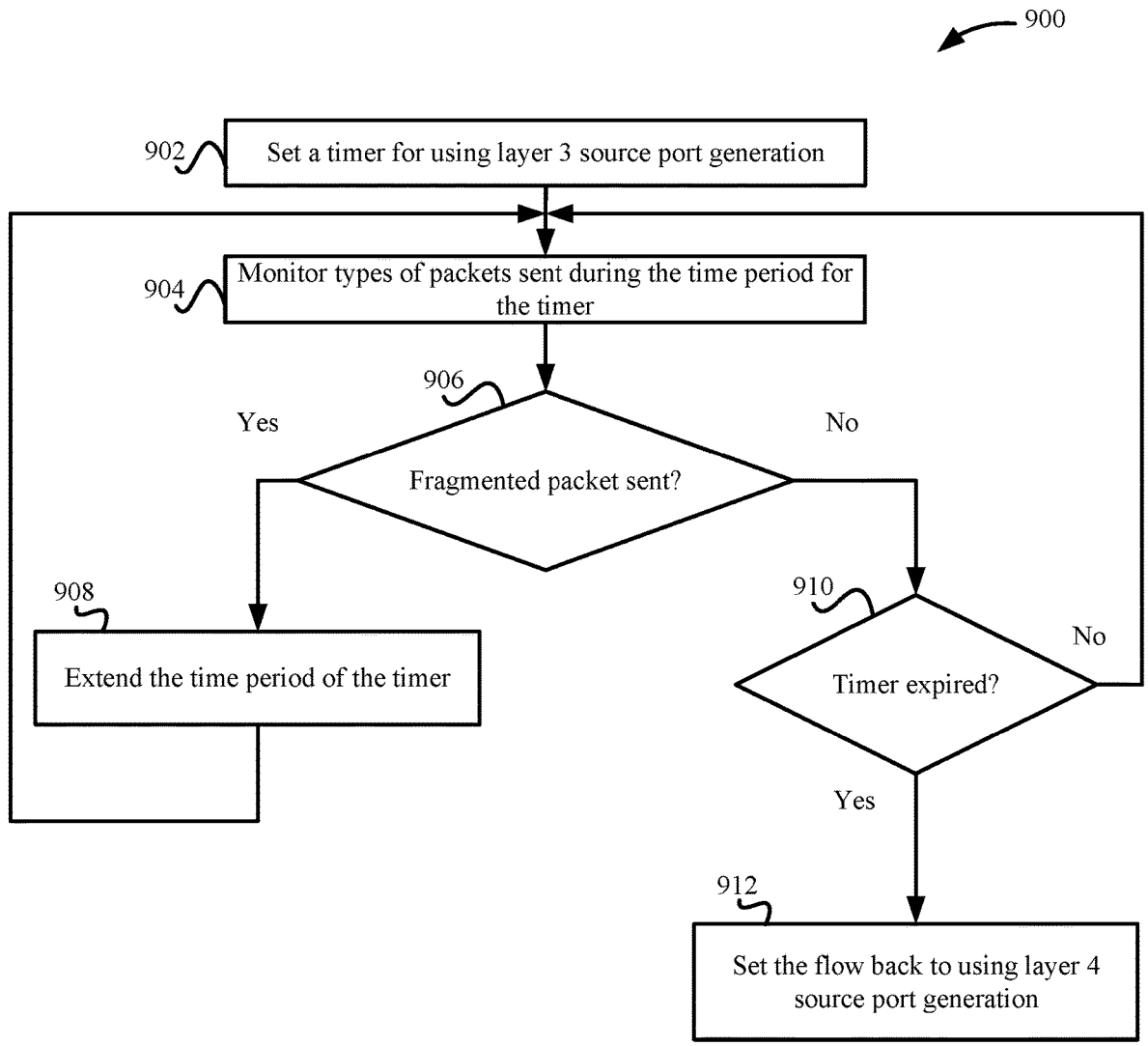
FIG. 9 depicts a simplified flowchart for using a time-based method to switch back to layer 4 source port generation according to some embodiments.

Virtual switch 104 may use another process that is time-based. FIG. 9 depicts a simplified flowchart for using a time-based process to switch back to layer 4 source port generation according to some embodiments. At 902, virtual switch 104 sets a timer for using layer 3 source port generation. Virtual switch 104 may set the timer at a pre-defined time limit, which may be a fraction of the flow entry timeout, which may be a time in which virtual switch 104 removes the flow, such as when there is no activity on the flow. That is, instead of waiting for the flow entry timeout to occur, the timer may be for a time shorter than the timeout period such that virtual switch 104 can switch back to layer 4 source port generation sooner than the flow ending.

At 904, virtual switch 104 monitors the types of packets being sent for the flow during the time period for the timer. The types of packets may be whether a flow sends fragmented packets or non-fragmented packets. At 906, virtual switch 104 determines if a fragmented packet is sent in the flow. If so, at 908, virtual switch 104 extends the time period for the timer. By extending the time period, virtual switch 104 is extending the period to switch back to layer 4 source port generation to provide a buffer such that virtual switch 104 does not switch back to layer 4 source port generation and then have to switch back to layer 3 source port generation because another fragmented packet is sent. The process then continues to monitor the types of packets being sent in the flow. If during the monitoring, a fragmented packet is not sent, at 910, virtual switch 104 determines if the timer has expired. If the timer has not expired, then virtual switch 104 continues to monitor the types of packets being sent. If the timer has expired, then at 912, virtual switch 104 sets the flow back to using layer 4 source port generation. By using the timer for a time period, virtual switch 104 may provide a buffer to see if workload 106 will be sending additional fragmented packets. This may lessen the chance virtual switch 104 may have to switch back to using layer 3 information for outer source port generation again because packets below the maximum transmission unit size have been sent for a buffer period.

Figure 10:
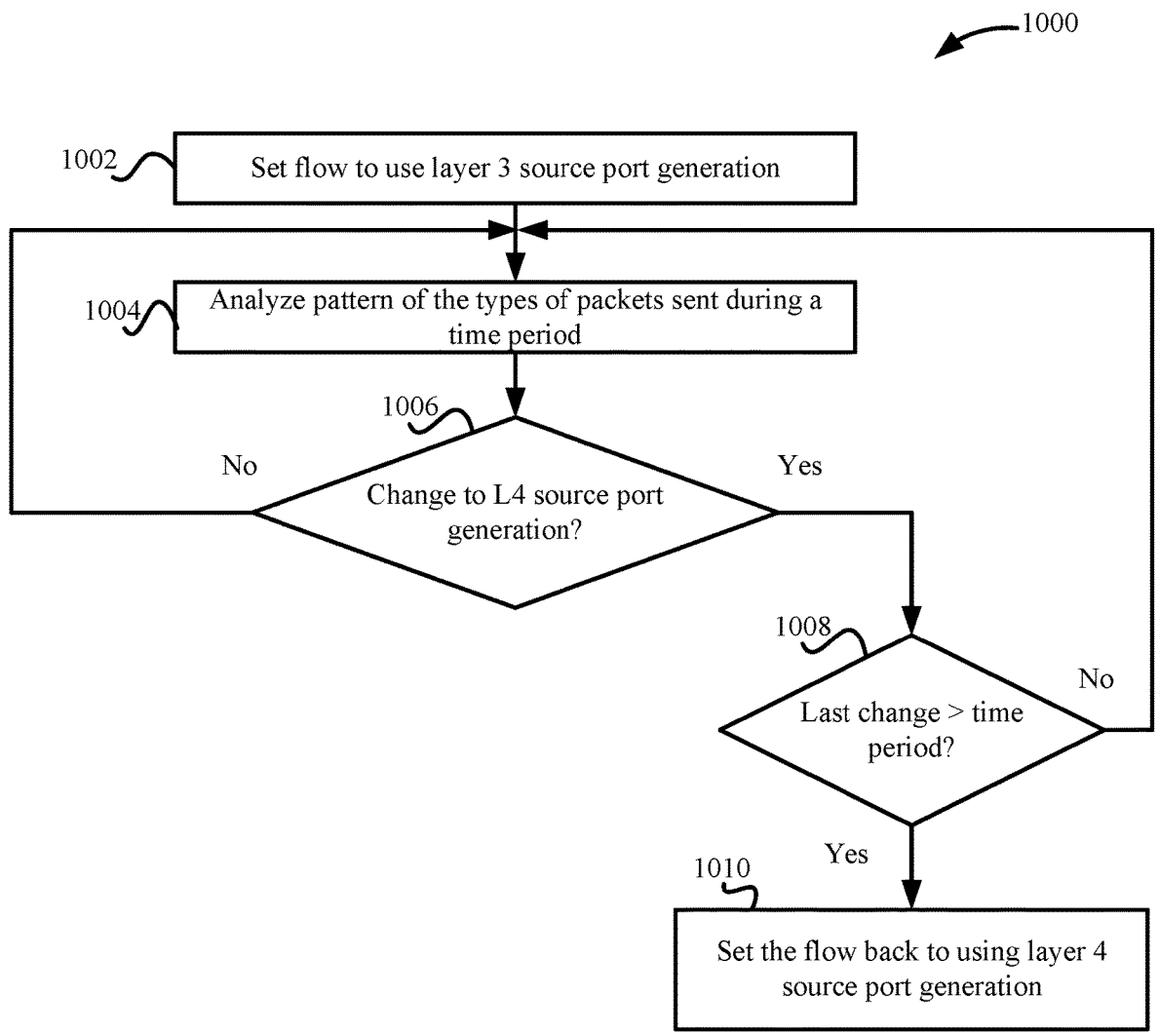
FIG. 10 depicts a simplified flowchart for using a prediction process according to some embodiments.

Virtual switch 104 may also use a heuristic process that may analyze a pattern of data of packets to predict when the change back to using layer 4 source port generation. FIG. 10 depicts a simplified flowchart 1000 for using a prediction process according to some embodiments. At 1002, virtual switch 104 sets the flow to use layer 3 source port generation. Then, at 1004, virtual switch 104 analyzes a pattern of the types of packets sent during a time period by the flow. For example, a network, such as a prediction network (e.g., a neural network) or a rules based process, may analyze the pattern of fragmented versus non-fragmented packets for a flow. Based on the pattern, the network may determine a prediction of whether or not to change back to layer 4 source port generation. The prediction may be based upon whether it is predicted that fragmented packets may occur. The network may be trained to receive a pattern of packet types and predict the next X packet types in some embodiments. In other embodiments, the network may output a value that indicates layer 3 source port generation or a value that indicates layer 4 source port generation.

At 1006, virtual switch 104 determines whether a change is predicted to use layer 4 information for outer source port generation. For example, virtual switch 104 may analyze the predicted X types of packets to determine if fragmented packets are predicted. Or, virtual switch 104 may determine whether the value indicates layer 3 source port generation or layer 4 source port generation. If a change is not predicted, the process reiterates to 1004 to continue to perform the prediction. However, if the prediction is to change to using layer 4 source port generation, virtual switch 104 may automatically switch to layer 4 source port generation or may use a further test to determine whether to switch back to layer 4 source port generation. For example, virtual switch 104 may want to avoid switching back to layer 4 source port generation too soon after switching to layer 3 source port generation to avoid switching between layer 3 source port generation and layer 4 source port generation too frequently. For example, at 1008, virtual switch 104 determines if the last change that occurred is greater than a time period. If not, then the process reiterates to continue determining a prediction at 1004. However, if the last change is greater than the time period, at 1010, virtual switch 104 sets the flow back to using layer 4 source port generation.

Flow Processing

As discussed above, when generating different source ports for the two different flows, processing of the flows may be differentiated, such as services including load balancing may be injected in the processing path of the flows. The following describes some services, but other processing services may be used.

Figure 11A:
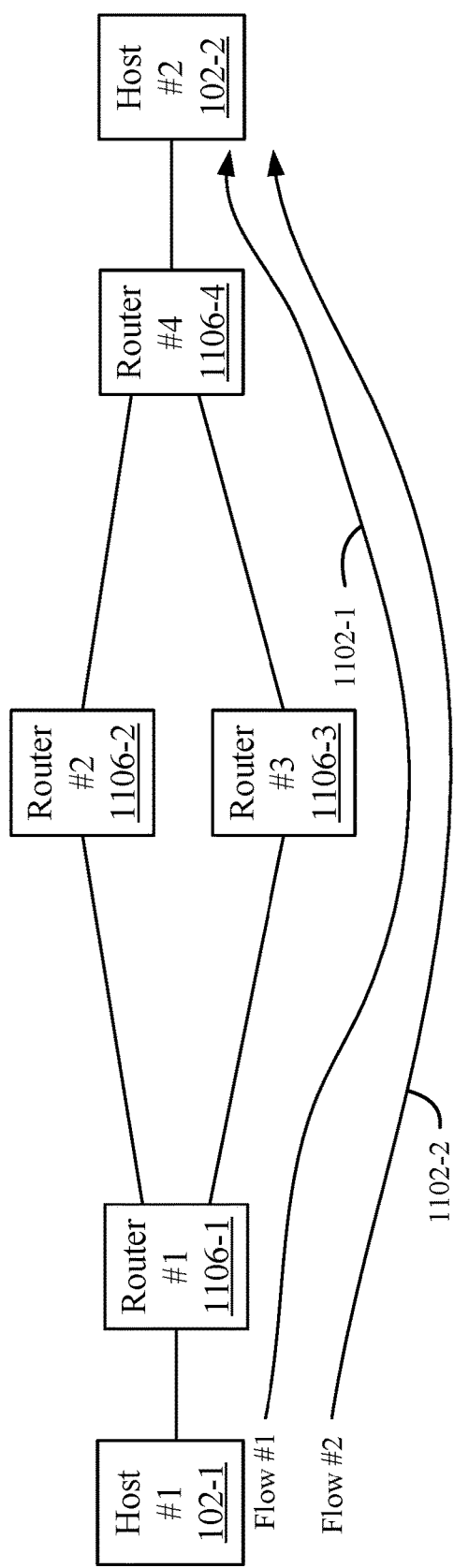
FIG. 11A depicts an example of load balancing over a physical network that may occur.

FIG. 11A depicts an example of load balancing over physical network 116 that may occur. Physical network 116 may include multiple paths that may be used to send packets to the same destination. For example, physical network 116 may include a router #1 1106-1 that can use two different paths to reach router #4 1106-4, which can then send a packet to host #2 102-2. For example, a first path is through router #2 1106-2 and a second path is through router #3 1106-3. Different load balancing processes may be used, such as using equal cost multi-path (ECMP) load balancing. The load balancing process may use information in the outer header to determine which path to take. Flow #1 may be associated with application #1 108-1 and application #3 108-3 and flow #2 may be associated with application #2 108-2 and application #4 108-4. In FIG. 11A, source port generator 114 uses layer 3 information from the inner UDP header to generate the outer source port. As discussed above, this means that the outer source port is the same for both flows. Accordingly, if the outer source IP address, the outer destination IP address, the outer source port, and the outer destination port (and the next level protocol) are the same, then router #1 1106-1 may send flow #1 at 1102-1 and flow #2 at 1102-2 through the same path of router #3 1106-3. This does not provide parallelization of processing for the two different flows through different paths.

Figure 11B:
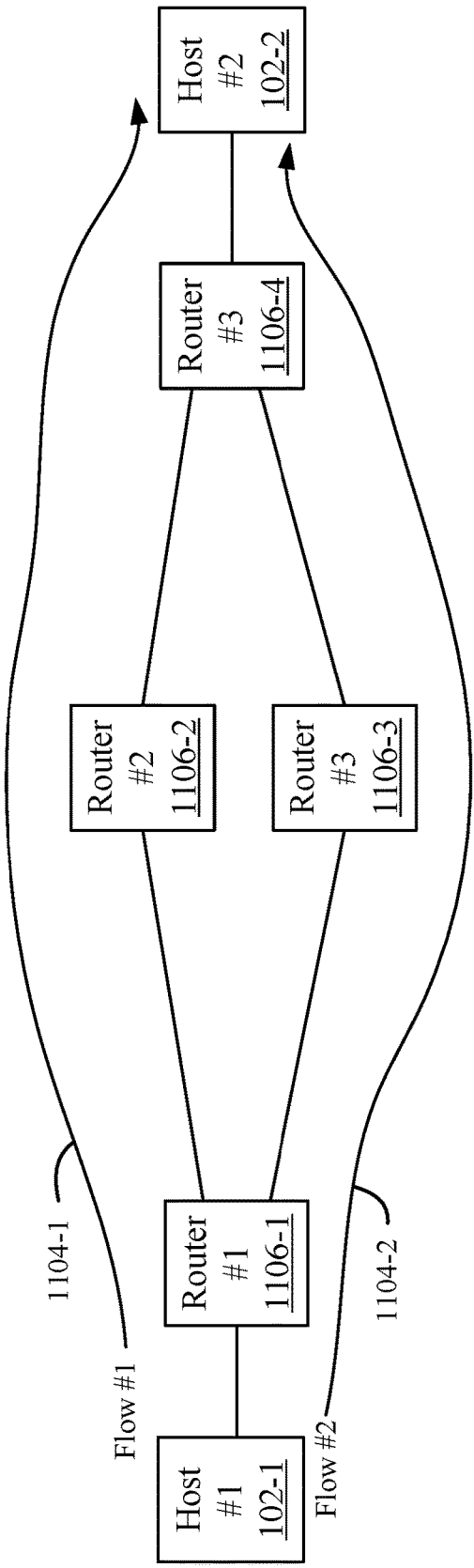
FIG. 11B depicts an example of paths taken using layer 4 source port generation according to some embodiments.

FIG. 11B depicts an example of paths taken using layer 4 source port generation according to some embodiments. As shown, flow #1 may be sent through a path at 1104-1 through router #2 1106-2 and flow #2 at 1104-2 may be sent through a path through router #3 1106-3. The load balancing process may generate different values for packets of the different flows because the outer source ports are different in the outer headers of packets for the different flows. Accordingly, a load balancer can differentiate packets for the two flows and may send packets for the flows through the two different paths.

Figure 12:
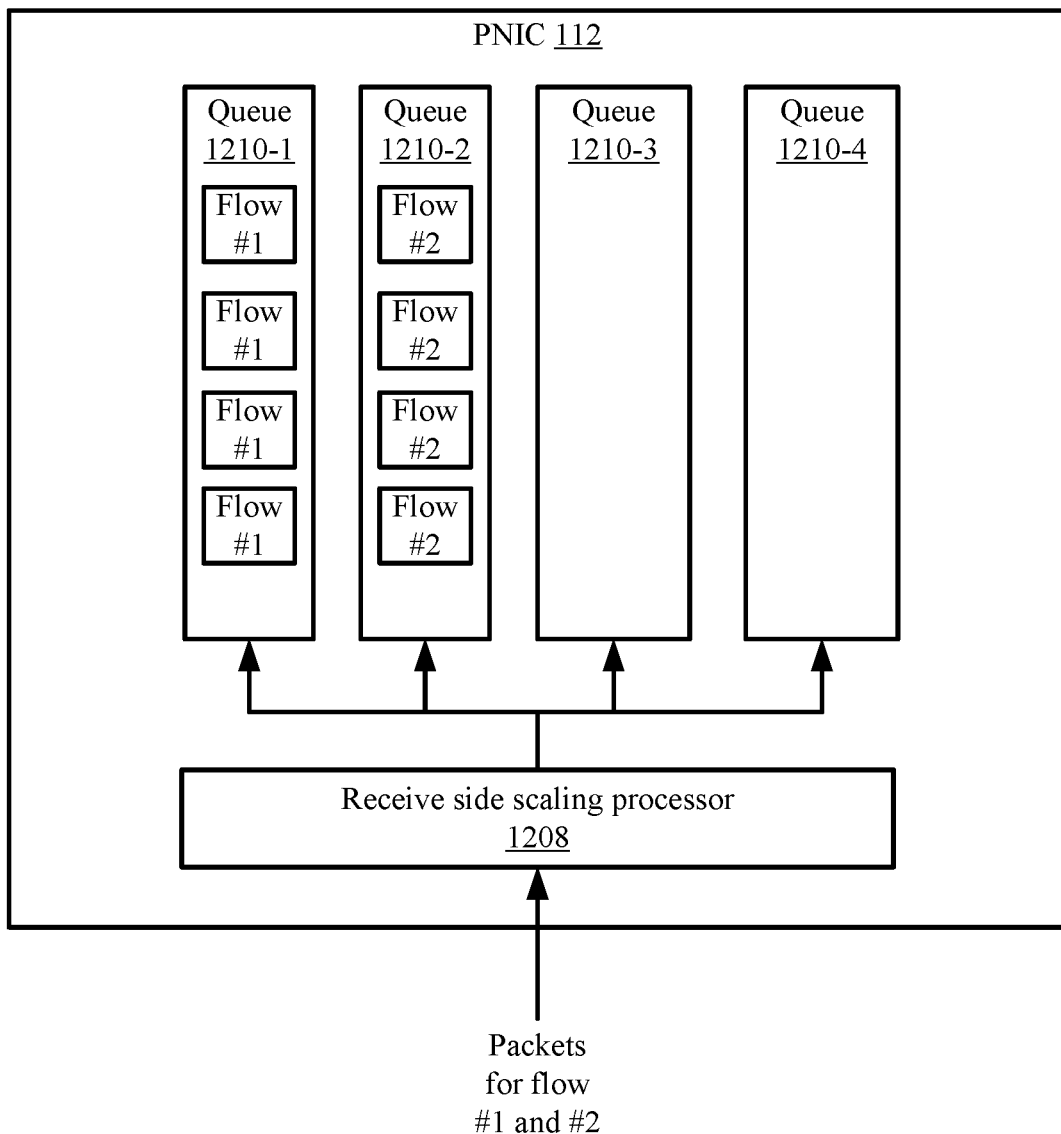
FIG. 12 depicts an example of receive side scaling using source port generation according to some embodiments.

Load balancing may also be performed in PNICs 112 using receive side scaling. Receive side scaling may place flows on different queues that process packets in PNIC 112. For example, FIG. 12 depicts an example of receive side scaling using source port generation according to some embodiments. PNIC 112 may include queues 1210-1 to 1210-4 that may process packets. In some embodiments, each queue 1210 may be associated with a different computer processor that performs operations associated with a respective queue 1210. Accordingly, packets in each queue 1210 may be processed in parallel by respective computer processors.

A receive side scaling processor 1208 receives packets for flow #1 and flow #2. Receive side scaling processor 1208 may calculate a queue 1210 to assign to the flow based on information in the outer header of the packets. When the outer source port is different for flow #1 and flow #2, receive side scaling processor 1208 may associate a different queue 114 for each flow. As shown, receive side scaling processor 1208 has assigned packets from flow #1 to queue 114-1 and packets from flow #2 to queue 114-2. It will be understood that packets in queues 114 may be references to packets that are stored in memory. Accordingly, flow #1 and flow #2 may be processed in parallel in different queues achieving parallelization. If the source port was the same, it is possible that receive side scaling processor 1208 would assign packets for flow #1 and flow #2 to the same queue when using a hash of the outer source IP address, the outer destination IP address, the outer source port, the outer destination port, and the next level protocol to determine the queue.

In addition to receive side scaling, load balancing may be performed in other areas. For example, workloads 106 may also include receive queues that may be associated with different computer processors. The same load balancing as described with respect to receive side scaling may also be applied to the receive queues of workloads 106.

CONCLUSION

Accordingly, virtual switch 104 can perform layer 4 source port generation, which allows the system to apply load balancing to different flows between the same workloads. However, when a fragmented packet is encountered, virtual switch 104 may switch to layer 3 source port generation. Then, virtual switch 104 uses a process to determine when to switch back to using layer 4 source port generation to again allow processes to load balance the flows between different applications in the same workloads 106. The process allows the flows to utilize load balancing when non-fragmented packets are being sent and also protects against introducing re-ordering of packets when an application is sending a mix of large and small packets.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
   determining when a packet is fragmented into multiple fragmented packets in a flow between a first workload and a second workload, wherein the fragmented packets include an inner header that is encapsulated with an outer header;
   switching from generating an outer source port in the outer header using layer 4 information from the inner header to using layer 3 information from the inner header, wherein the layer 3 information is associated with a source address of the first workload and a destination address of the second workload;
   encapsulating a fragmented packet with the outer header, wherein the outer header includes an outer source port value that is generated using the layer 3 information;
   initiating a process to determine when to switch back to using layer 4 information from the inner header to generate the outer source port; and
   when it is determined to switch back to using layer 4 information, switching back to using layer 4 information from the inner header to generate the source port in the outer header of a packet from the first workload.

2. The method of claim 1, wherein switching back to using layer 4 information comprises:
   determining a status of the flow that indicates the flow considered ended; and
   removing an indication to use layer 3 information to generate the source port.

3. The method of claim 1, wherein switching back to using layer 4 information comprises:
   setting a timer;
   analyzing a type of packets being sent in the flow, wherein the type includes a fragmented packet and a non-fragmented packet; and
   determining whether to switch back to using layer 4 information using the timer based on the analyzing.

4. The method of claim 3, further comprising:
   adding an amount of time to the timer when a fragmented packet is encountered, wherein switching back to using layer 4 information is based on the timer expiring.

5. The method of claim 1, wherein the process analyzes a type of packets being sent in the flow and predicts a type of packet, and switching back to using layer 4 information comprises:
   determining whether to switch back to using layer 4 information using a prediction from the predicted type of packet.

6. The method of claim 1, wherein:
   the flow is associated with a first flow,
   a second flow includes a same outer source port when using the layer 3 information of the source address associated with the first workload and the destination address associated with the second workload from the inner header to generate the outer source port, and
   the second flow includes a different outer source port when using the layer 3 information and the layer 4 information to generate the outer source port.

7. The method of claim 6, wherein:
   the first flow is associated with a first application in the first workload, the first application being associated with a first inner source port, and
   the second flow is associated with a second application in the first workload, the second application being associated with a second inner source port.

8. A non-transitory computer-readable storage medium containing instructions, that when executed, control a computer system to be operable for:
   determining when a packet is fragmented into multiple fragmented packets in a flow between a first workload and a second workload, wherein the fragmented packets include an inner header that is encapsulated with an outer header;
   switching from generating an outer source port in the outer header using layer 4 information from the inner header to using layer 3 information from the inner header, wherein the layer 3 information is associated with a source address of the first workload and a destination address of the second workload;
   encapsulating a fragmented packet with the outer header, wherein the outer header includes an outer source port value that is generated using the layer 3 information;
   initiating a process to determine when to switch back to using layer 4 information from the inner header to generate the outer source port; and
   when it is determined to switch back to using layer 4 information, switching back to using layer 4 information from the inner header to generate the source port in the outer header of a packet from the first workload.

9. The non-transitory computer-readable storage medium of claim 8, wherein switching back to using layer 4 information comprises:
   determining a status of the flow that indicates the flow considered ended; and
   removing an indication to use layer 3 information to generate the source port.

10. The non-transitory computer-readable storage medium of claim 8, wherein switching back to using layer 4 information comprises:
    setting a timer;
    analyzing a type of packets being sent in the flow, wherein the type includes a fragmented packet and a non-fragmented packet; and
    determining whether to switch back to using layer 4 information using the timer based on the analyzing.

11. The non-transitory computer-readable storage medium of claim 10, further operable for:
    adding an amount of time to the timer when a fragmented packet is encountered, wherein switching back to using layer 4 information is based on the timer expiring.

12. The non-transitory computer-readable storage medium of claim 8, wherein the process analyzes a type of packets being sent in the flow and predicts a type of packet, and switching back to using layer 4 information comprises:
    determining whether to switch back to using layer 4 information using a prediction from the predicted type of packet.

13. The non-transitory computer-readable storage medium of claim 8, wherein:
    the flow is associated with a first flow,
    a second flow includes a same outer source port when using the layer 3 information of the source address associated with the first workload and the destination address associated with the second workload from the inner header to generate the outer source port, and
    the second flow includes a different outer source port when using the layer 3 information and the layer 4 information to generate the outer source port.

14. The non-transitory computer-readable storage medium of claim 13, wherein:
    the first flow is associated with a first application in the first workload, the first application being associated with a first inner source port, and
    the second flow is associated with a second application in the first workload, the second application being associated with a second inner source port.

15. An apparatus comprising:
    one or more computer processors; and
    a non-transitory computer-readable storage medium comprising instructions, that when executed, control the one or more computer processors to be operable for:
    determining when a packet is fragmented into multiple fragmented packets in a flow between a first workload and a second workload, wherein the fragmented packets include an inner header that is encapsulated with an outer header;
    switching from generating an outer source port in the outer header using layer 4 information from the inner header to using layer 3 information from the inner header, wherein the layer 3 information is associated with a source address of the first workload and a destination address of the second workload;
    encapsulating a fragmented packet with the outer header, wherein the outer header includes an outer source port value that is generated using the layer 3 information;
    initiating a process to determine when to switch back to using layer 4 information from the inner header to generate the outer source port; and
    when it is determined to switch back to using layer 4 information, switching back to using layer 4 information from the inner header to generate the source port in the outer header of a packet from the first workload.

16. The apparatus of claim 15, wherein switching back to using layer 4 information comprises:
    determining a status of the flow that indicates the flow considered ended; and
    removing an indication to use layer 3 information to generate the source port.

17. The apparatus of claim 15, wherein switching back to using layer 4 information comprises:
    setting a timer;
    analyzing a type of packets being sent in the flow, wherein the type includes a fragmented packet and a non-fragmented packet; and
    determining whether to switch back to using layer 4 information using the timer based on the analyzing.

18. The apparatus of claim 17, further operable for:
    adding an amount of time to the timer when a fragmented packet is encountered, wherein switching back to using layer 4 information is based on the timer expiring.

19. The apparatus of claim 15, wherein the process analyzes a type of packets being sent in the flow and predicts a type of packet, and switching back to using layer 4 information comprises:
    determining whether to switch back to using layer 4 information using a prediction from the predicted type of packet.

20. The apparatus of claim 15, wherein:
    the flow is associated with a first flow,
    a second flow includes a same outer source port when using the layer 3 information of the source address associated with the first workload and the destination address associated with the second workload from the inner header to generate the outer source port, and
    the second flow includes a different outer source port when using the layer 3 information and the layer 4 information to generate the outer source port.

21. The apparatus of claim 20, wherein:
    the first flow is associated with a first application in the first workload, the first application being associated with a first inner source port, and
    the second flow is associated with a second application in the first workload, the second application being associated with a second inner source port.

* * * * *